(12) United States Patent
Foster et al.

(10) Patent No.: US 6,273,119 B1
(45) Date of Patent: Aug. 14, 2001

(54) EXHAUST CONTROL VALVE AND METHOD OF MANUFACTURING SAME

(75) Inventors: Michael Ralph Foster, Columbiaville; Kenneth A. Smith, Grand Blanc, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/519,810

(22) Filed: Mar. 6, 2000

(51) Int. Cl.$^7$ ................................................. F16K 27/00
(52) U.S. Cl. ................................ 137/15.25; 137/15.18; 251/305; 251/308; 251/366
(58) Field of Search .................... 251/305, 308, 251/366; 137/15.18, 15.25

(56) References Cited

U.S. PATENT DOCUMENTS

| | | |
|---|---|---|
| 5,630,571 | 5/1997 | Kipp et al. . |
| 5,979,871 | * 11/1999 | Forbes .............................. 251/305 |
| 6,036,172 | * 3/2000 | Pajard ............................... 251/305 X |
| 6,182,633 | * 2/2001 | Rauch ............................... 251/305 X |

* cited by examiner

*Primary Examiner*—Kevin Lee
(74) *Attorney, Agent, or Firm*—Vincent A. Cichosz

(57) ABSTRACT

A method of manufacturing an exhaust control valve includes casting first and second subhousings as separate pieces and machining smooth the inner faces of both. Each subhousing has a stem portion and a flow portion. Each flow portion defines a cylindrical bore from which a seat arc extends radially inward and approximately 180° along. The seat arc of the first subhousing lies below, and the seat arc of the second subhousing lies above, a horizontal plane that bisects the subhousings. Each seat arc has a semicircular inner sidewall that serves as a valve seat. Their inner faces facing each other, the two subhousings are mated so that their two stem portions form a stem housing and their two flow portions form a flow housing. During the mating step, the cylindrical bores are aligned to form a flow passage through the flow housing, with the two valve seats spaced equidistantly from a vertical plane defined by the inner faces along which the subhousings mate. In further steps, the method involves boring at least one bore into the stem housing. A rotatable shaft is sealingly enclosed within the bore(s) and it protrudes into the flow passage. Another step entails affixing the valve plate to the shaft so that it will pivot between the opened and closed positions as the shaft is being rotated accordingly.

21 Claims, 4 Drawing Sheets

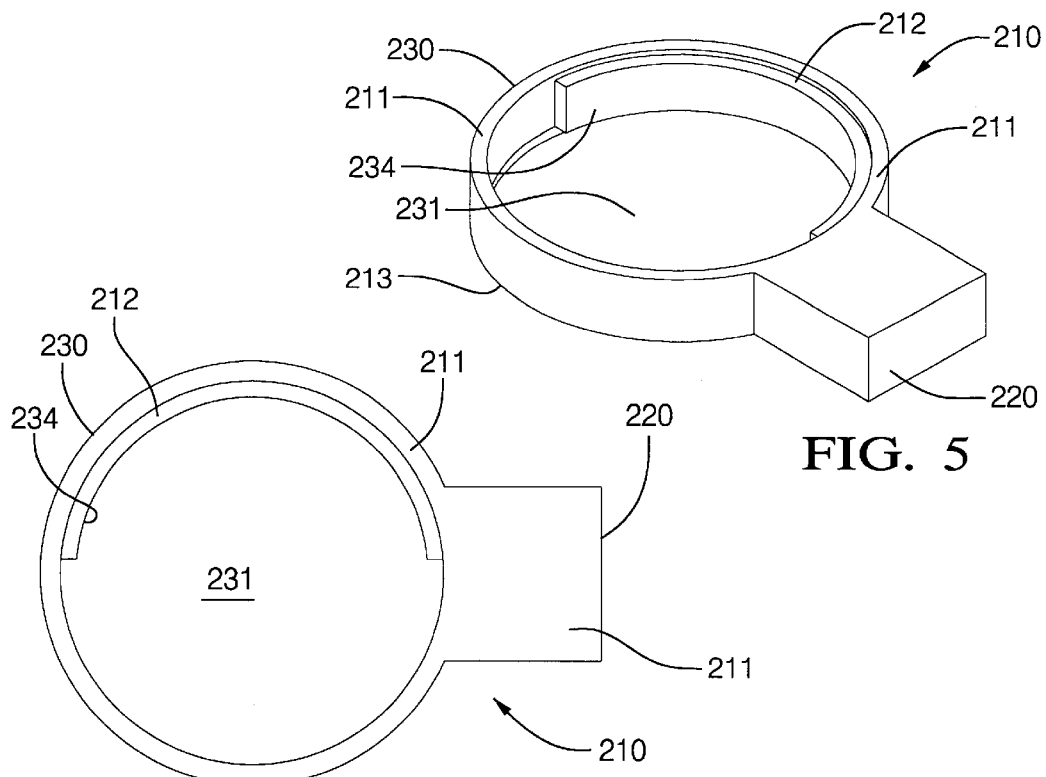
FIG. 5
FIG. 6
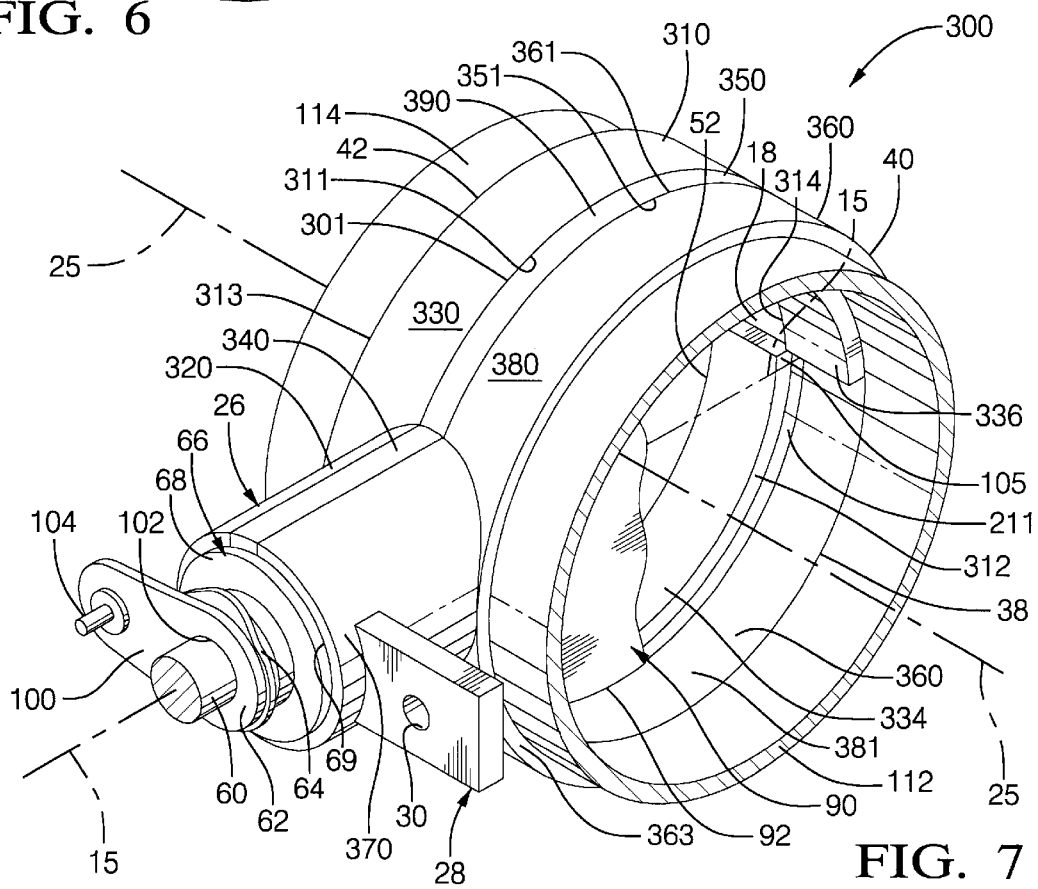
FIG. 7

EXHAUST CONTROL VALVE AND METHOD OF MANUFACTURING SAME

FIELD OF THE INVENTION

The invention relates generally to valves of the type used to switch the flow of exhaust gases automatically from one catalytic converter to another within an exhaust system of a motor vehicle. More particularly, the invention pertains to a method of manufacturing an exhaust control valve so that its valve seats can be machined more easily and at lower cost than the valve seats of the prior art valve. The invention also pertains to an exhaust control valve that that comprises two or more subhousings separately cast and combined together.

BACKGROUND OF THE INVENTION

Federal and state governments have imposed increasingly strict regulations over the years governing the levels of hydrocarbon (HC), carbon monoxide (CO) and nitrogen oxide ($NO_x$) pollutants that a motor vehicle may emit to the atmosphere. One approach to reducing the emissions of these pollutants involves the use of a catalytic converter. Placed within the exhaust gas stream between the exhaust manifold of the engine and the muffler, the catalytic converter is one of the several emissions control devices typically found on a motor vehicle.

The catalytic converter is essentially a reaction chamber that contains an oxidation catalyst, typically in the form of one or more monolithic substrates, coated with a high surface area ceramic wash-coat and one or more precious metals such as Platinum, Palladium or Rhodium. When the engine is running, the exhaust gases from the exhaust manifold flow through the converter and pass heat to those composite materials housed within it. Once heated to a suitably high temperature, the composite materials convert a large percentage of the pollutants in the passing exhaust gases to carbon dioxide ($CO_2$), water ($H_2O$) and other benign substances. Until the converter is brought up to operating temperature, however, its composite materials do not operate as effectively. As is well known, the catalytic converter is particularly inefficient when it is at its coolest, just after the engine is started cold. Consequently, absent other means of reducing such emissions while the engine and converter are warming up, a significant percentage of the pollutants would pass to atmosphere until the catalytic converter is sufficiently heated to operate satisfactorily.

One approach that has been proposed to reduce the emission of HC, CO and $NO_x$ pollutants while the exhaust system is cold is to use a second catalytic converter, often referred to as a warm-up converter. The warm-up converter would be small in size and located near the engine so that it could warm-up quickly. It would employ composite materials (i.e., a substrate, an oxidation catalyst and catalytic material coating) specially formulated to reach operating temperature quickly, thereby quickly rendering the warm-up converter capable of efficiently converting the pollutants in the exhaust gas. This is significant, as most of the pollutants are produced during the first minute or two after the engine is started. Until the engine and exhaust system have warmed to the point at which the conventional converter is operating more effectively, the exhaust gases during this "warm-up period" would be routed into the warm-up converter to remove the pollutants from the exhaust gases.

Given its proximity to the engine, the warm-up converter will generally not be able to withstand continuous exposure to certain harmful poisons carried by the exhaust gases. In particular, engine oil that may have been burned in the combustion chambers will be carried away by the exhaust gases into the exhaust system. Certain compounds in the oil, such as zinc-dithio-phosphate, will gradually coat the catalyst in the warm-up converter and soon render it ineffective. Prolonged exposure to the exhaust gases will therefore prematurely degrade the composite materials inside the warm-up converter.

A solution to this problem would be to strategically place an exhaust control valve within the exhaust system. Controlled by the engine control module (ECM) or other control component with feedback from a suitable sensor, the exhaust control valve can be automatically opened to allow exhaust gases to flow through the warm-up converter during the warm-up period and closed to prevent such flow afterward. By switching the flow of the exhaust gases away from the warm-up converter after the warm-up period, the exhaust control valve would then protect it from the relatively high temperatures and the harmful compounds carried by the exhaust gases. This tends to keep the warm-up converter free of poisons and highly effective during the warm-up period. After the warm-up period, the conventional converter due to its large size best treats the HC, CO and $NO_x$ pollutants. The large size of the conventional converter makes it more resistant to such poisoning.

This approach makes best use of both converters. The warm-up converter operates with peak efficiency quickly due to its close proximity to the engine during the critical warm-up period. Thereafter, only the conventional converter treats the exhaust gases. While flowing through the section of the exhaust pipe leading to the conventional converter, the exhaust gases are lowered in temperature somewhat. Soon operating within the desired temperature range, the composite materials in the conventional converter efficiently treat the pollutants in the exhaust gases. Deployed together in this control scheme using the exhaust control valve, the two catalytic converters reduce the HC, CO and $NO_x$ emissions far better than the conventional converter can alone. This is because they collectively treat the exhaust gases over more of the engine operating time than the conventional converter can by itself.

In such a control scheme, the exhaust control valve must be capable of operating over a wide range of temperatures, for example, from below 0° C. to over 1000° C. In particular, the valve must not stick or bind at any temperature within that range. It must open completely to let the exhaust gases flow through its flow passage. Conversely, it must close with a seal that is sufficient to prevent the exhaust gases from entering the warm-up converter after the warm-up period. Furthermore, the exhaust control valve must not allow exhaust gases to leak outside the exhaust system through its various joints.

A traditional butterfly valve would generally not be suitable for use as an exhaust control valve. The valve body for this type of valve defines a cylindrical inner bore that serves as a flow passage. Through the outer sidewall of the body is defined an opening through which a stem or shaft protrudes perpendicularly into the flow passage. Within the flow passage is placed a circular valve plate. Also referred to as the butterfly, the valve plate typically has an elongated slot formed within it into which the shaft is securely attached. Controlled in a known manner, the shaft can be rotated so that the valve plate, or butterfly, pivots within the flow passage between the opened and closed positions.

The butterfly valve is designed so that when the valve plate is pivoted to the closed position its perimeter contacts the cylindrical inner bore of the valve body. Experience has shown that this design is inadequate for the environment that an exhaust control valve must endure. In particular, the valve plate and body expand and contract, so much so that it is difficult to achieve a good seal over the temperature range to which the valve would be exposed. This design requires the valve body, valve plate and various other parts to be manufactured to meet extremely tight tolerances, thus increasing the cost. Extreme accuracy must be exercised in fitting the valve plate to the inner bore. If the dimensions of these critical parts are not within design tolerances or thermal expansion and contraction are not accounted for, the valve plate in the closed position will fail to adequately seal off the flow passage. In addition, the close proximity of the perimeter of the valve plate to the inner bore of the body tends to cause particulate matter to build up on those surfaces, further impeding the operation of the valve. Consequently, butterfly valves tend to leak excessively.

Various types of valves have been proposed for use as an exhaust control valve. One type of valve designed for this purpose is disclosed in U.S. Pat. No. 5,630,571 to Kipp et al., hereby incorporated by reference into this document. FIGS. 1, 2 and 3 herein show the exhaust control valve taught in that reference. Specifically, the Kipp et al. valve has a flow housing 10, a stem housing 26 and a mounting bracket 28. A hole 30 in the bracket 28 allows an actuator to be to attached the exhaust control valve. The valve mounts to the exhaust system through inlet and outlet pipes 112 and 114. The Kipp et al. valve is described in the following paragraphs, as it is an example of the many types of exhaust control valve that can be improved by the invention disclosed within this document.

FIGS. 1 and 2 best illustrate the structure of the stem housing 26. Through its components, the stem housing 26 provides a mounting for the shaft that is to be pivoted within it. This mounting includes seals that prevent leakage of exhaust gases from the flow passage of housing 10 through the stem housing 26 to the environment outside the exhaust system.

The stem housing 26 defines a first bored opening 79 into which has been press fit a first bushing 78. A second bored opening 75, axially adjacent to and coaxial with the first bored opening 79, provides an interior working space 74 between the first bushing 78 and a second bushing 66. Inside space 74, a steel washer 72 is affixed to a shaft 60 so that it is located between the two bushings 78 and 66 when the valve is assembled. Washer 72 has a flat end 71 facing bushing 78 and a convex-shaped end 80 facing bushing 66. A ceramic washer 70 is located between washer 72 and bushing 66. It has a concave surface 82 shaped to receive the convex end 80 of washer 72. Washer 70 is neither rigidly attached to stem housing 26 nor to shaft 60.

The concave surface 82 of washer 70 and the convex end 80 of washer 72 engage to form an annular socket joint that seals when force in the axial direction of shaft 60 presses the steel washer 72 against the ceramic washer 70. A radially extending portion 68 of bushing 66 is press fit into a third opening 69 bored into stem housing 26. Bushing 66 with its extending portion 68 thus not only prevents washer 70 from moving out of stem housing 26 but also seals off the interior working space 74. Ceramic washer 70 provides a tight seal against both steel washer 72 and the flat annular shaped extending portion 68 of bushing 66. It also prevents fusion of the various sealing parts when the valve is operating at high temperatures.

Bushing 66 also helps provide a stable mounting for the shaft 60. A flat retainer 62 is press fit via hole 102 onto shaft 60 and together with bearing 66 sandwiches a wave washer 64. Retainer 62 is positioned so that wave washer 64 is compressed and thereby exerts along its axis a spring force between bushing 66 and retainer 62. This provides a biasing force on shaft 60 in the direction of arrow 61. The spring force provided by wave washer 64 biases washer 72 against washer 70, thereby sandwiching washer 70 between washer 72 and the extending portion/end cap 68 of bushing 66. The gap between the interior surfaces of bushings 78 and 66 and the shaft 60 must be wide enough to allow for thermal expansion of shaft 60 and for adequate clearance under all manufacturing conditions. This prevents shaft 60 from being in airtight engagement with bushing 78 or bushing 66. As biased by wave washer 64, however, the washers 70/72 and end cap 68 together provide the seal that prevents exhaust gas from escaping to the outside atmosphere.

FIGS. 1 and 2 show that the retainer 62 is preferably part of an actuator arm 100. Actuator arm 100 thus not only keeps wave washer 64 in place but also acts as a lever to which an actuator of some type connects. Attached to the lever, pin 104 serves as an easily accessible site to which a pneumatic or solenoid based actuator can link. Ultimately controlled by the ECM or like component, the actuator is what actually moves the actuator arm 100 via pin 104. The actuator arm, in turn, is what pivots the shaft 60 and the valve plate 90 within the flow passage of housing 10 between the opened and closed positions.

The flow housing 10 defines a cylindrical inner bore that serves as the flow passage. The interior wall of the cylindrical bore can be viewed as comprising a wall portion 16 and a wall portion 18 separated by an imaginary vertical plane that passes through a pivot axis 15 of shaft 60, as best viewed from the perspective of FIG. 1. The thickness of housing 10 is denoted by numeral 32 in FIG. 3. Extending radially inward from the interior wall by an additional thickness 22 are two seat arcs 34 and 36. Each seat arc is essentially a thickened portion of the interior wall. The two seat arcs 34 and 36 are equidistant from the vertical plane, spaced apart from each other by a distance 35 that is approximately equal to the thickness of plate 90. Seat arc 34 extends inwardly from wall portion 18 over almost 180° of arc along the interior wall below a horizontal plane that passes through the pivot axis 15. Similarly, seat arc 36 extends inwardly from wall portion 16 over almost 180° of arc along the interior wall above that horizontal plane. Manifested as a circular ledge, the inner side of seat arc 34 serves as a valve seat 12. Likewise, the circular ledge or inner side of seat arc 36 serves as a valve seat 14.

The flow housing 10 may be installed within an exhaust system with or without the use of connecting tubes 112 and 114. Connecting tube 112 may be seated in one end 40 of housing 10 against a tube seat formed by outer side 48 of seat arc 36 and its narrower arcuate extension, outer side 38. As best shown in FIG. 1, outer side 38 extends nearly 180° of the arc within end 40, and outer side 48 extends the other approximately 180° of arc within end 40. Similarly, connecting tube 114 may be seated in the other end 42 of housing 10 against a tube seat formed by both an outer side 52 of seat arc 34 and its narrower extension, outer side 44, as best shown in FIG. 3.

Through the cylindrical sidewall of housing 10 is defined an opening, designated 20/24 in FIG. 3. This opening extends through the seat arcs 34 and 36, as is also shown in FIG. 2. Specifically, numeral 20 also denotes a semicircular gap in seat arc 34 that has been bored out of, or otherwise omitted from, housing 10. Similarly, numeral 24 denotes a semicircular gap in seat arc 36 that has been omitted from housing 10. Together, these omitted portions comprise the opening 20/24 in the sidewall of housing 10 through which shaft 60 protrudes from stem housing 26 perpendicularly into the flow passage.

Within the flow passage is situated the circular valve plate 90. The valve plate 90 has an outer perimeter 92. As best shown in FIG. 2, the valve plate has an elongated slot that fits around the end of shaft 60. Shaft 60 may mount to one side 91 of plate 90 or even extend to its other side 93. Although other known methods can be employed, the valve plate is typically affixed to shaft 60 by laser welding, a quick method that prevents warping of plate 90 as it avoids generation of excess heat. Controlled using an actuator as described above, the shaft 60 can be rotated so that the valve plate 90 pivots within the flow passage between the opened and closed positions.

Just inside its perimeter, valve plate 90 has a pair of semi-annular facets, or arcuate sectors, 94 and 96, each extending approximately 180° of arc on the outermost circular edges of the disk. The arcuate sectors, however, are located not only on opposite faces of valve plate 90 but also on opposite sides of pivot axis 15. Specifically, arcuate sectors 94 and 96 seat on valve seats 12 and 14, respectively, when the valve plate 90 is in the closed position within the flow passage. As best shown in FIGS. 2 and 3, the arcuate sectors 94 and 96 cover most of the surface of their respective seats 12 and 14 when the valve plate is closed. Because the diameter of plate 90 is selected to be smaller than the diameter of the inner bore of housing 10, the thermal expansion of the plate 90 and housing 10 need not exactly match. This design thus allows for some expansion and contraction of the valve plate 90 and housing 10 over the range of expected operating temperatures. The valve plate 90 will not stick or bind within the inner bore at any temperature within that range.

Assuming the internal surfaces and parts of the Kipp et al. valve are manufactured to meet design tolerances, the arcuate sectors 94 and 96 of valve plate 90 should seal fairly well against the valve seats 12 and 14. Because seats 12 and 14 extend radially inward a substantially equal distance over their respective 180° arcs, no leaks of exhaust gas should occur between the perimeter 92 of plate 90 and the interior wall of housing 10. Nevertheless, the design is not completely impervious to leakage. Some leakage is to be expected through region 105. Referring again to the imaginary horizontal plane that passes through pivot axis 15, seat arcs 34 and 36 each fall short of that plane by a distance equal to roughly half of the thickness of plate 90. This region 105, shown in FIG. 1, allows allow room for valve plate 90 to be pivoted to the fully opened position. When the valve plate 90 is closed, however, exhaust gas can leak through this region. The magnitude of the leak, however, would be relatively inconsequential. The slight leakage would pose no substantial risk of damage to the warm-up converter with which the exhaust control valve of U.S. Pat. No. 5,630,571 is used.

Despite its advantages over traditional butterfly valves, the Kipp et al. exhaust control valve still has its drawbacks. To achieve the required low level of leakage needed to protect the warm-up converter after the warm-up period, certain parts of the valve must meet extremely tight tolerances. In particular, the position at which the seat arcs 34/36 are formed within the inner bore of housing 10 must be controlled relative to the shaft 60 and the valve plate 90 to which it is attached. The distance between seat arcs 34 and 36, the flatness of both the seats 12/14 and the arcuate sectors 94/96, and the thickness of plate 90 must also be kept within extremely close limits.

Moreover, the flow housing 10 is made from a single piece of metal, typically stainless steel. This makes it very difficult to machine the valve seats 12 and 14 on seat arcs 34 and 36, respectively. Specifically, the rotating milling tool used to machine the seats 12 and 14 must be of a very small diameter. This is because the ends of the two seat arcs 34 and 36 are so close together, as evidenced by region 105 in FIG. 1. The milling tool must have a small diameter so that it can machine the surface of seat 12 at the end of seat arc 34, and yet not bump into and/or damage the other seat 14 at the end of seat arc 36 that lies in such close proximity, and vice versa. In this confined region, the end of each seat arc tends to get in the way of the milling tools used to machine the seats 12/14.

OBJECTIVES OF THE INVENTION

It is therefore an objective of the invention to provide a method of manufacturing that produces an exhaust control valve that is less costly to produce and exhibits less leakage than prior art exhaust control valves.

Another objective is to provide an exhaust control valve formed from two or more subhousings whose valve seats can be machined more easily and accurately and at lower cost as compared to the valve seats of prior art exhaust control valves.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the accompanying drawings and claims.

SUMMARY OF THE INVENTION

In two presently preferred embodiments, the invention provides an exhaust control valve and a method of manufacturing it to attain the foregoing objectives and advantages.

In one embodiment, the exhaust control valve comprises first and second subhousings. Between its inner and outer faces, the first subhousing has a first flow portion and a first stem portion. The first stem portion projects outward from the first flow portion. The first flow portion defines a first cylindrical bore through itself amid its inner and outer faces. The first flow portion has a first seat arc that extends radially inward from and approximately 180° along the first cylindrical bore below a horizontal plane that bisects the first subhousing. Recessed within the inner face, the first seat arc has a semicircular inner sidewall that serves as a first valve seat. Between its inner and outer faces, the second subhousing has a second flow portion and a second stem portion. The second stem portion projects outward from the second flow portion. The second flow portion defines a second cylindrical bore through itself amid its inner and outer faces. The second flow portion has a second seat arc that extends radially inward from and approximately 180° along the second cylindrical bore above a horizontal plane that bisects the second subhousing. Recessed within the inner face, the second seat arc has a semicircular inner sidewall that serves as a second valve seat. The first and said second subhousings are mated by said inner faces so that the two stem portions join to form a single stem housing and the two flow portions join to form a single flow housing. With the two subhousings mated in this way, the first and second cylindrical bores align along a flow axis to form a flow passage through the flow housing. Also, the first and second valve seats are spaced equidistantly from a vertical plane defined at the site at which the inner faces of the first and second subhousings are mated.

In a further aspect, the stem housing formed by the two subhousings defines at least one cylindrical bore along a pivot axis that is transverse to the flow axis. This pivot axis is situated at the intersection of the vertical and horizontal planes. The exhaust control valve further includes a shaft and a valve plate. Sealingly enclosed within the cylindrical bore(s), the shaft protrudes into the flow passage of the flow housing and is rotatable about the pivot axis between an opened position and a closed position. The valve plate is affixed to the shaft so that it pivots between the opened and closed positions as the shaft is rotated. When the shaft is rotated to the closed position, a first arcuate sector of the valve plate seats upon the first valve seat as a second arcuate sector of the valve plate seats upon the second valve seat thereby preventing flow of exhaust gas through the flow passage. When the shaft is rotated to the opened position, the valve plate with its arcuate sectors pivots away from the valve seats thereby allowing exhaust gas to flow through the flow passage.

The method of manufacturing the exhaust control valve summarized above comprises several steps. The steps include casting the first and second subhousings as separate pieces and machining smooth the inner faces of both subhousings. The semicircular inner sidewall of the first seat arc is machined smooth to form the first valve seat recessed within the inner face of the first flow portion. Similarly, the semicircular inner sidewall of the second seat arc is machined smooth to form the second valve seat recessed within the inner face of the second flow portion. Another step pertains to the mating of the two subhousings so that the two stem portions join to form the stem housing and the two flow portions join to form the flow housing. During the mating step, due regard is exercised so that the first and second cylindrical bores align to form the flow passage through the flow housing and the two valve seats are spaced equidistantly from the vertical plane defined at the site at which the subhousings are mated.

In further steps, the method involves boring the cylindrical bore(s) into the stem housing and sealingly enclosing the rotatable shaft within the cylindrical bore(s) so that it protrudes into the flow passage of the flow housing. In another step, the method entails affixing the valve plate to the shaft so that it will pivot between the opened and closed positions as the shaft is being rotated accordingly.

BRIEF DESCRIPTION OF THE DRAWINGS

FIG. 5 is a perspective view of a subhousing of the type illustrated in FIG. 4.

FIG. 6 is a top view of the subhousing shown in FIG. 5.

FIG. 7 is a perspective view of an exhaust control valve formed from three subhousings according to an alternative embodiment of the invention.

DETAILED DESCRIPTION OF THE INVENTION

Figure 1:
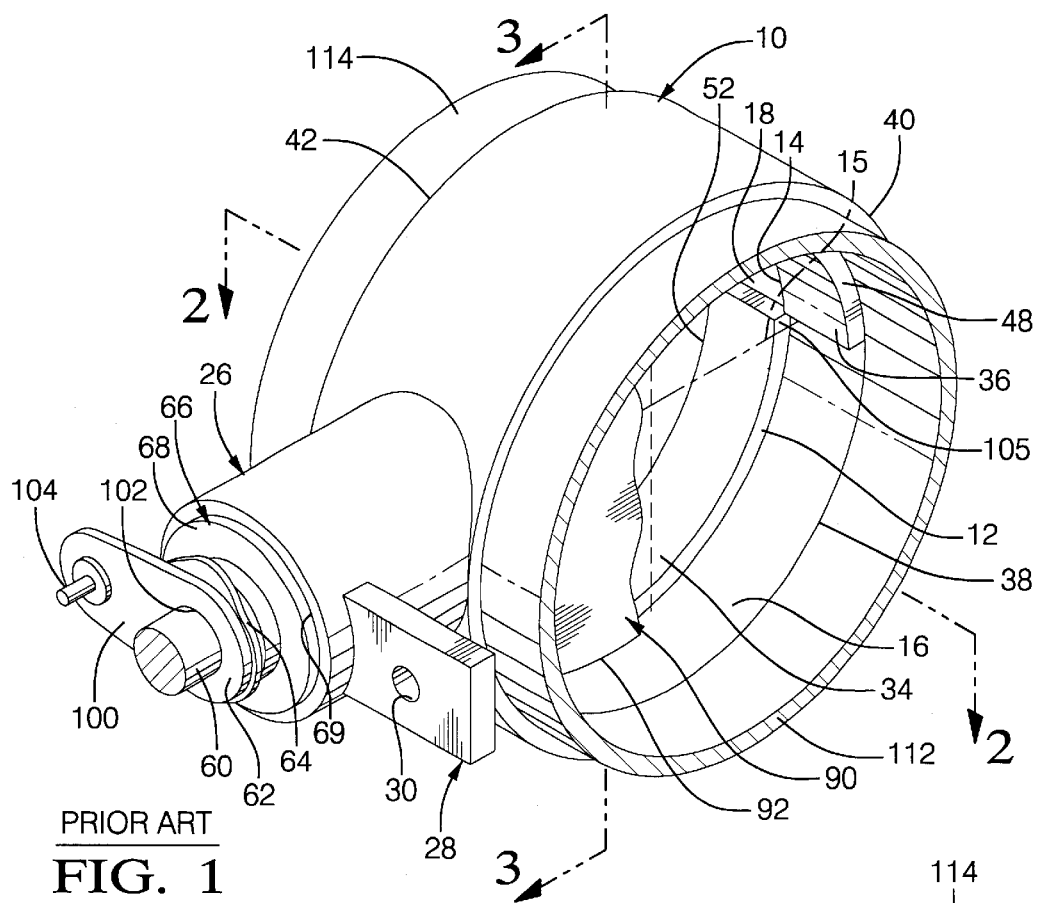
FIG. 1 is a perspective view of a prior art exhaust control valve showing a valve plate, a shaft and two seat arcs disposed within a cylindrical inner bore of a valve housing.
Figure 2:
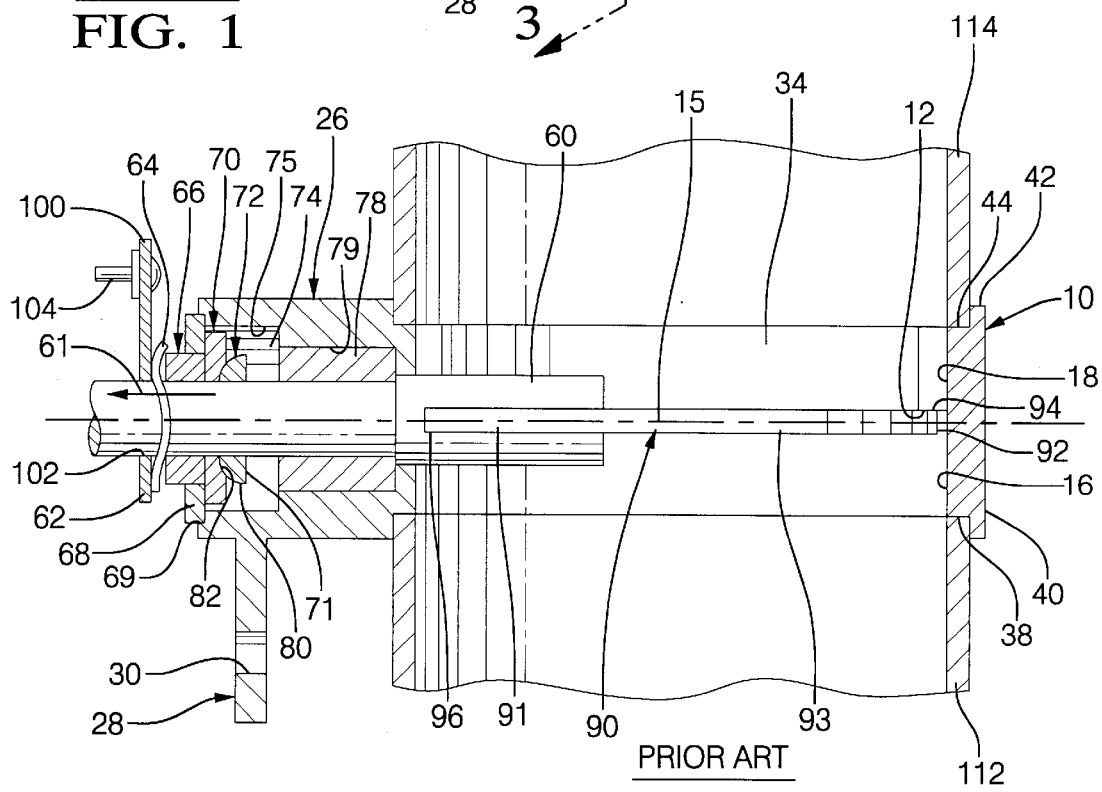
FIG. 2 is a cross-sectional view of the prior art exhaust control valve along the horizontal plane indicated by section lines I—I in FIG. 1.
Figure 3:
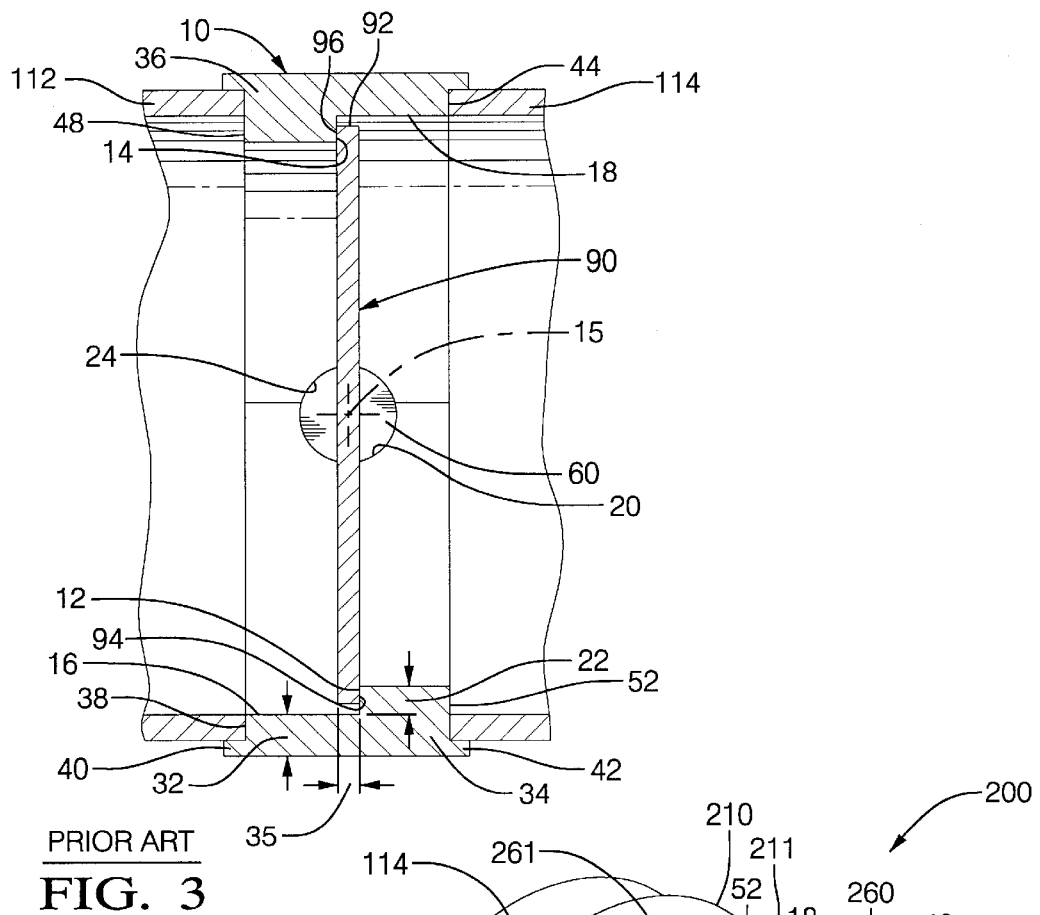
FIG. 3 is a cross-sectional view of the prior art exhaust control valve along the vertical plane indicated by section lines II—II in FIG. 1.

Before describing the invention in detail, the reader is advised that, for the sake of clarity and understanding, identical components having identical functions have been marked where possible with the same reference numerals in each of the Figures provided in this document.

Figure 4:
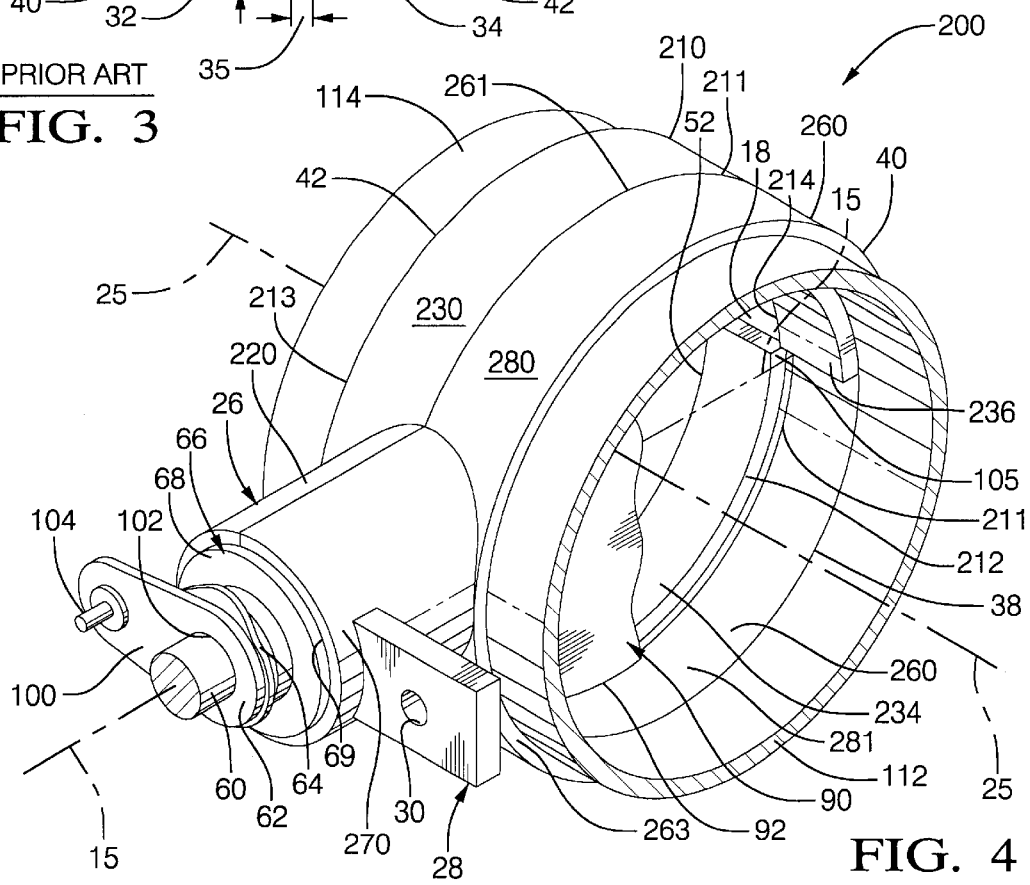
FIG. 4 is a perspective view of an exhaust control valve formed from two subhousings according to a presently preferred embodiment of the invention.

FIGS. 4–6 illustrate the essential details of a presently preferred embodiment of the invention. The invention is a method of manufacturing that produces an exhaust control valve, generally designated 200, that is a substantial improvement upon the Kipp et al. exhaust control valve discussed in background.

The most essential steps of the method are as follows. The first step involves casting a first subhousing 210 and a second subhousing 260. The two subhousings may be identical, at least initially. Shown in FIGS. 5 and 6 is first subhousing 210. It has an inner face 211 and an outer face 213. Between its faces, the first subhousing 210 has a first stem portion 220 and a first flow portion 230. The first stem portion 220 projects outward from the first flow portion 230. The first flow portion 230 defines a first cylindrical bore 231 amid the inner and outer faces 211 and 213. It also has a first seat arc 234 that extends radially inward from and approximately 180° along the first cylindrical bore 231. From the perspective of FIG. 4, the first seat arc 234 lies below a horizontal plane that bisects first subhousing 210. The horizontal plane lies along the plane defined by pivot axis 15 and flow axis 25 in FIG. 4.

The second subhousing 260 has an inner face 261 and an outer face 263. Between its faces, the second subhousing 260 has a second stem portion 270 and a second flow portion 280. Stem portion 270 projects outward from flow portion 280. Defining a second cylindrical bore 281 amid its faces, second flow portion 280 has a second seat arc 236 that extends radially inward from and nearly 180° along the second cylindrical bore 281. From the perspective of FIG. 4, the second seat arc 236 lies above the horizontal plane defined by pivot axis 15 and flow axis 25.

As should be apparent from FIGS. 4–6, the subhousings are interchangeable except for the mounting bracket 28. The inner faces 211/261, the valve seats 212/214 and the tube seats 38/44 may be machined into the subhousings. The machining of the inner faces is important for at least two reasons. First, the inner faces should be machined flat and smooth because they are the surfaces by which the first and second subhousings 210 and 260 are to be mated. Second, the inner faces provide the reference level from which the valve seats of the exhaust control valve 200 are to be machined. Specifically, inner face 211 provides the requisite flat surface from which the first valve seat 212 may be accurately machined inside first subhousing 210. Similarly, inner face 261 provides the flat surface from which the second valve seat 214 may be accurately machined inside second subhousing 260.

After the subhousings have been cast, the semicircular inner sidewall of seat arc 234 will typically lie flush with the inner face 211 of first subhousing 210. The same applies for the semicircular inner sidewall of seat arc 236 with respect to the inner face 261 of second subhousing 260. After the inner surfaces have been machined flat, the next step involves the machining of the valve seats. Specifically, the inner sidewall of first seat arc 234 is machined flat and smooth to form a first valve seat 212. As best shown in FIG. 5, the first valve seat 212 is recessed within inner face 211 of first flow portion 230. Similarly, the inner sidewall of second seat arc 236 is machined flat and smooth to form a second valve seat 214 recessed within the inner face 261 of second flow portion 280. The tube seats 38 and 44 may also be formed within the outer ends 40 and 42, respectively, of the subhousings. Tube seats 38 and 44 would allow the connecting tubes 112 and 114, respectively, to seat within the opposing ends of valve 200.

The mating of the two subhousings is another step in manufacturing the exhaust control valve 200. During the mating step, the inner faces 211 and 261 of the two subhousings are brought into contact with each other and aligned so that the two stem portions join to form a single stem housing 220/270 and the two flow portions join to form a single flow housing 230/280. By mating the two subhousings in this way, the first and second cylindrical bores 231 and 281 align along a single flow axis, denoted by numeral 25, to form a single flow passage 231/281 through the flow housing. In addition, the first and second valve seats 212 and 214 are spaced equidistantly from a vertical plane defined at the site at which the inner faces 211 and 261 of the first and second subhousings have been mated. Although the seats 212 and 214 are on opposite sides of the horizontal plane, the distance between them will basically be equal to the thickness of valve plate 90. The inner faces 211 and 261 of the two subhousings are preferably mated by laser welding.

Other steps in the manufacture of the exhaust control valve 200 are as follows. With the subhousings mated together, at least one cylindrical bore is bored into the stem housing 220/270 along the pivot axis 15 so as to communicate with the flow passage 231/281. The pivot axis 15 is transverse to the flow axis 25, and is situated at the intersection of the vertical and horizontal planes. The boring(s) in the stem housing may be identical to the boring(s) 79, 75, and 69 made within the prior art Kipp et al. exhaust control valve.

An alternative technique of implementing the boring(s) in the stem housing 220/270 may be accomplished during the casting step. Specifically, the casting of first subhousing 210 could involve forming at least one semicylindrical groove within first stem portion 220. Similarly, the casting of second subhousing 260 could involve forming at least one semicylindrical groove within second stem portion 270. The stem housing 220/270 formed by the subhousings defines the aforementioned boring(s) due to the pairing of the opposing semicylindrical grooves. The resulting boring(s) may require machining to smooth out any rough spots or other imperfections in the interior surface(s) of the boring(s).

A shaft 60 is then sealingly enclosed within the boring(s) The shaft 60 must protrude into the flow passage 231/281 and be rotatable about pivot axis 15 between the opened and closed positions. Inside the flow passage 231/281, a valve plate 90 is then affixed to shaft 60 so that it will pivot between the opened and closed positions as the shaft is rotated accordingly.

The shaft and valve plate may also be implemented in much the same manner as that disclosed in the prior art. When shaft 60 is rotated to the closed position, the first arcuate sector 94 of valve plate 90 seats upon first valve seat 212 as the second arcuate sector 96 of valve plate 90 seats upon second valve seat 214 thereby preventing flow of exhaust gas through the flow passage 231/281. When the shaft is rotated to the opened position, the valve plate 90 with its arcuate sectors 94 and 96 pivots away from the valve seats 212 and 214 thereby allowing exhaust gas to flow through the flow passage 231/281.

Figure 8:
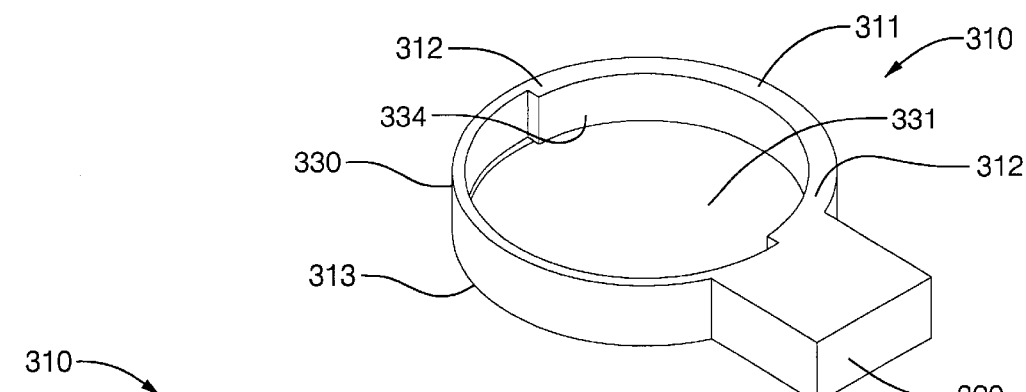
FIG. 8 is a perspective view of an outer subhousing of the type illustrated in FIG. 7.
Figure 9:
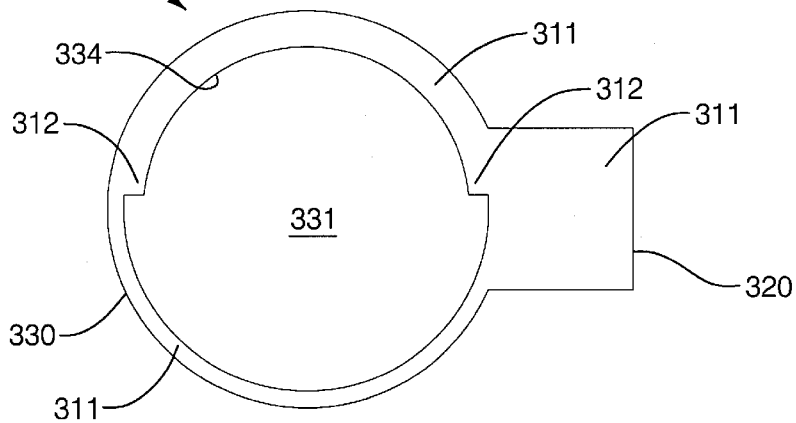
FIG. 9 is a top view of the subhousing shown in FIG. 8.
Figure 10:
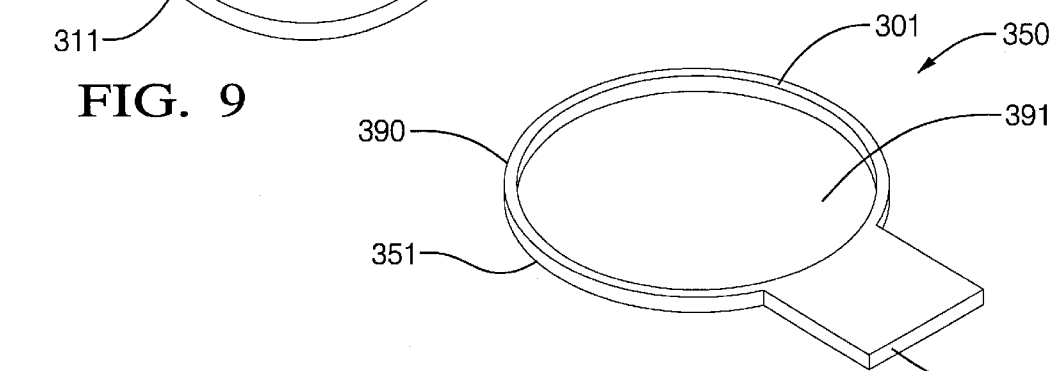
FIG. 10 is a perspective view of a center subhousing of the type illustrated in FIG. 7.
Figure 11:
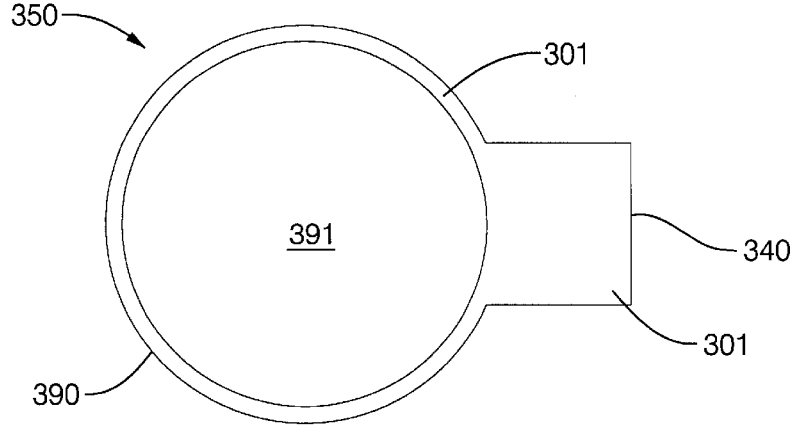
FIG. 11 is a top view of the center subhousing shown in FIG. 10.

FIGS. 7–11 illustrate the essential details of an alternative method of manufacturing an exhaust control valve, generally designated 300. The first step involves casting a first subhousing 310 and a second subhousing 360. The two subhousings are identical, at least initially. Shown in FIGS. 8 and 9 is first subhousing 310. It has an inner face 311 and an outer face 313. Between its faces, the first subhousing 310 has a first stem portion 320 and a first flow portion 330. First stem portion 320 projects outward from the first flow portion 330. The first flow portion 330 defines a first cylindrical bore 331 amid the inner and outer faces 311 and 313. It also has a first seat arc 334 that extends radially inward from and approximately 180° along the first cylindrical bore 331. From the perspective of FIG. 7, the first seat arc 334 lies below a horizontal plane that bisects first subhousing 310. The horizontal plane lies along the plane defined by pivot axis 15 and flow axis 25 in FIG. 7.

The second subhousing 360 has an inner face 361 and an outer face 363. Between its faces, the second subhousing 360 has a second stem portion 370 and a second flow portion 380. Stem portion 370 projects outward from flow portion 380. Defining a second cylindrical bore 381 amid its faces, second flow portion 380 has a second seat arc 336 that extends radially inward from and nearly 180° along the second cylindrical bore 381. From the perspective of FIG. 7, the second seat arc 336 lies above the horizontal plane defined by pivot axis 15 and flow axis 25.

The first and second subhousings 310 and 360 are cast so that the semicircular inner sidewalls of the seat arcs lie flush with the inner faces. Unlike with the first embodiment, the inner sidewalls are not recessed within the inner faces of the flow portions. They may, however, require machining to smooth out any rough spots or other imperfections. Specifically, the semicircular inner sidewall of first seat arc 334 forms a first valve seat 312. As best shown in FIGS. 8 and 9, the first valve seat 312 is flush with inner face 311 of first flow portion 330. Similarly, flush with inner face 361, the inner sidewall of second seat arc 336 forms a second valve seat 314 on second flow portion 380. The tube seats 38 and 44 may also be formed within the outer ends 40 and 42, respectively, of the subhousings. Tube seats 38 and 44 would allow the connecting tubes 112 and 114, respectively, to seat within the opposing ends of exhaust control valve 300.

The center subhousing 350 may also be cast. Between its first and second faces 301 and 351, the center subhousing has a center stem portion 340 and a center flow portion 390. Stem portion 340 projects outward from flow portion 390. Center subhousing 350 also defines a center cylindrical bore 391 amid its faces. The predetermined thickness of center subhousing 350 will basically be equal to the thickness of valve plate 90. The faces 301 and 351 may require machining to smooth out any imperfections because it is with them that the inner faces 311 and 361 of subhousings 310 and 360, respectively, mate.

It should be apparent that the center subhousing 350 could be fabricated employing either a casting or a shearing operation. For example, the center subhousing 350 may be sheared from sheet metal. In this case, the center cylindrical bore 391 could be defined within the center flow portion 390 by a stamping or punching operation. The valve plate 90 could be made from the disk that is stamped or punched out during this operation.

The mating of the subhousings is another step in manufacturing the exhaust control valve 300. During this step, the three subhousings are brought together as follows. The inner face 311 of first subhousing 310 is brought into contact with the first face 301 of center subhousing 350. The inner face 361 of second subhousing 360 is brought into contact with the second face 351 of center subhousing 350. The three subhousings are aligned so that so that the three stem portions join to form a single stem housing 320/340/370 and the three flow portions join to form a single flow housing 330/390/380. By mating the subhousings in this way, the first, center and second cylindrical bores 331, 391 and 381 align along a single flow axis 25 to form a single flow passage 331/391/381 through the flow housing. In addition, the first and second valve seats 312 and 314 are spaced equidistantly from the vertical plane that is itself situated equidistantly between the first and second faces 301 and 351 of center subhousing 350. Although the seats 312 and 314 are on opposite sides of the horizontal plane, the distance between them will basically be the thickness of plate 90. Laser welding is again the preferred means of mating the subhousings 310, 350 and 360.

Once the subhousings are mated, the next step involves boring at least one cylindrical bore into stem housing 320/340/370 along pivot axis 15 so as to communicate with flow passage 331/391/381. Pivot axis 15 is transverse to flow axis 25, and is situated at the intersection of the vertical and horizontal planes. The boring(s) in the stem housing may be identical to the boring(s) 79, 75, and 69 made in the Kipp et al. exhaust control valve.

An alternative technique of implementing the boring(s) in the stem housing 320/340/370 may be accomplished during the casting step. Specifically, the casting of first subhousing 310 could involve forming at least one partially cylindrical groove within first stem portion 320. Similarly, the casting of second subhousing 360 could involve forming at least one partially cylindrical groove within second stem portion 370. Center stem portion 340 would also have suitably shaped groove(s) formed in it during casting. The stem housing 320/340/370 formed by the mating of the subhousings defines the aforementioned boring(s) due to the alignment of these grooves. The resulting boring(s), of course, may require machining to smooth out any rough spots or other imperfections in the interior surface(s) of the boring(s).

Other steps in the manufacture of the exhaust control valve 300 are similar to those performed as part of the first method. The shaft 60 would be sealingly enclosed within the boring(s). Protruding into the flow passage 331/391/381, the shaft 60 would be rotatable about pivot axis 15 between the opened and closed positions. Inside the flow passage 331/391/381, the valve plate 90 is affixed to shaft 60 so that it will pivot between the opened and closed positions as the shaft is rotated accordingly.

When shaft 60 is rotated to the closed position, the first arcuate sector 94 of valve plate 90 seats upon first valve seat 312 as the second arcuate sector 96 of plate 90 seats upon second valve seat 314 thereby preventing flow of exhaust gas through the flow passage 331/391/381. When rotated to the opened position, shaft 60 pivots valve plate 90 so that its arcuate sectors 94 and 96 move away from the seats thereby allowing exhaust gas to flow through the flow passage 331/391/381.

The exhaust control valve 200 produced according to the first method of manufacture will tend to cost less than that produced according to the prior art method disclosed in the Kipp et al. reference. It will also cost less than the exhaust control valve 300 made according to the second method disclosed herein. The exhaust control valve 300 produced from the second method, however, will tend to leak less than either the prior art Kipp et al. valve or exhaust control valve 200. Although both methods produce an exhaust control valve whose internal surfaces can more readily meet the tight tolerances for flatness and finish imposed by such a design, the second method allows the relevant sealing surfaces to be ground even closer to ideal design specifications.

The presently preferred and alternative embodiments for carrying out the invention have been set forth in detail according to the Patent Act. Persons of ordinary skill in the arts to which the foregoing methods pertain may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

We claim:

1. A method of manufacturing a valve, said method comprising the steps of:

(a) casting a first subhousing having between an inner face and an outer face thereof a first flow portion and a first stem portion, said first stem portion projecting outward from said first flow portion, said first flow portion defining a first cylindrical bore therethrough amid said inner and said outer faces and having a first seat arc that extends radially inward from and approximately 180° along said first cylindrical bore below a horizontal plane that bisects said first subhousing;

(b) casting a second subhousing having between an inner face and an outer face thereof a second flow portion and a second stem portion, said second stem portion projecting outward from said second flow portion, said second flow portion defining a second cylindrical bore therethrough amid said inner and said outer faces and having a second seat arc that extends radially inward from and approximately 180° along said second cylindrical bore above a horizontal plane that bisects said second subhousing;

(c) machining smooth said inner faces of each of said first and said second subhousings;

(d) machining smooth a semicircular inner sidewall of said first seat arc so as to form a first valve seat recessed within said inner face of said first flow portion;

(e) machining smooth a semicircular inner sidewall of said second seat arc so as to form a second valve seat recessed within said inner face of said second flow portion; and (f) mating said first and said second subhousings by said inner faces thereof so that said first and said second stem portions join to form a single stem housing and said first and said second flow portions join to form a single flow housing with said first and said second cylindrical bores aligned along a flow axis to form a flow passage through said flow housing and with said first and said second valve seats spaced equidistantly from a vertical plane defined at the site at which said inner faces of said first and said second subhousings are mated.

2. The method recited in claim 1 further including the steps of:

(a) boring into said stem housing at least one cylindrical bore along a pivot axis that is transverse to said flow axis, with said pivot axis situated at the intersection of said vertical and said horizontal planes;

(b) sealingly enclosing a shaft within said at least one cylindrical bore with said shaft protruding into said flow passage of said flow housing, said shaft being rotatable about said pivot axis between an opened position and a closed position; and (c) affixing a valve plate to said shaft within said flow passage such that when said shaft is rotated to (I) said closed position, a first arcuate sector of said valve plate seats upon said first valve seat as a second arcuate sector of said valve plate seats upon said second valve seat thereby preventing flow of exhaust gas through said flow passage and (II) said opened position, said valve plate with said arcuate sectors thereon pivots away from said valve seats thereby allowing exhaust gas to flow through said flow passage.

3. The method recited in claim 2 wherein said valve plate has a thickness equal to the distance between said first and said second valve seats.

4. The method recited in claim 1 wherein said inner faces of said first and said second subhousings are mated together by laser welding.

5. The method recited in claim 1 wherein:

(a) the step of casting said first subhousing involves forming at least one semicylindrical groove within said first stem portion; and (b) the step of casting said second subhousing involves forming at least one semicylindrical groove within said second stem portion; such that said stem housing formed by the mating of said first and said second subhousings defines at least one cylindrical bore due to the mating of said at least one semicylindrical grooves, with said at least one cylindrical bore having a pivot axis transverse to said flow axis and situated at the intersection of said vertical and said horizontal planes.

6. The method recited in claim 5 further including the steps of:

(a) sealingly enclosing a shaft within said at least one cylindrical bore with said shaft protruding into said flow passage of said flow housing, said shaft being rotatable about said pivot axis between an opened position and a closed position; and (b) affixing a valve plate to said shaft within said flow passage such that when said shaft is rotated to (I) said closed position, a first arcuate sector of said valve plate seats upon said first valve seat as a second arcuate sector of said valve plate seats upon said second valve seat thereby preventing flow of exhaust gas through said flow passage and (II) said opened position, said valve plate with said arcuate sectors thereon pivots away from said valve seats thereby allowing exhaust gas to flow through said flow passage.

7. A valve comprising:

(a) a first subhousing having between an inner face and an outer face thereof a first flow portion and a first stem portion, said first stem portion projecting outward from said first flow portion, said first flow portion defining a first cylindrical bore therethrough amid said inner and said outer faces and having a first seat arc that extends radially inward from and approximately 180° along said first cylindrical bore below a horizontal plane that bisects said first subhousing, said first seat arc having a semicircular inner sidewall recessed within said inner face that serves as a first valve seat; and (b) a second subhousing having between an inner face and an outer face thereof a second flow portion and a second stem portion, said second stem portion projecting outward from said second flow portion, said second flow portion defining a second cylindrical bore therethrough amid said inner and said outer faces and having a second seat arc that extends radially inward from and approximately 180° along said second cylindrical bore above a horizontal plane that bisects said second subhousing, said second seat arc having a semicircular inner sidewall recessed within said inner face that serves as a second valve seat; said first and said second subhousings being mated by said inner faces thereof so that said first and said second stem portions join to form a single stem housing and said first and said second flow portions join to form a single flow housing with said first and said second cylindrical bores aligned along a flow axis to form a flow passage through said flow housing and with said first and said second valve seats spaced equidistantly from a vertical plane defined at the site at which said inner faces of said first and said second subhousings are mated.

8. The valve recited in claim 7 wherein said stem housing defines at least one cylindrical bore along a pivot axis that is transverse to said flow axis, with said pivot axis situated at the intersection of said vertical and said horizontal planes, said valve further including:

(a) a shaft sealingly enclosed within said at least one cylindrical bore, said shaft protruding into said flow passage of said flow housing and being rotatable about said pivot axis between an opened position and a closed position; and (b) a valve plate affixed to said shaft within said flow passage such that when said shaft is rotated to (I) said closed position, a first arcuate sector of said valve plate seats upon said first valve seat as a second arcuate sector of said valve plate seats upon said second valve seat thereby preventing flow of exhaust gas through said flow passage and (II) said opened position, said valve plate with said arcuate sectors thereon pivots away from said valve seats thereby allowing exhaust gas to flow through said flow passage.

9. The valve recited in claim 8 wherein said valve plate has a thickness equal to the distance between said first and said second valve seats.

10. The valve recited in claim 7 wherein said inner faces of said first and said second subhousings are mated together by laser welding.

11. A method of manufacturing a valve, said method comprising the steps of:

(a) casting a first subhousing having between an inner face and an outer face thereof a first flow portion and a first stem portion, said first stem portion projecting outward from said first flow portion, said first flow portion defining a first cylindrical bore therethrough amid said inner and said outer faces and having a first seat arc that extends radially inward from and approximately 180° along said first cylindrical bore below a horizontal plane that bisects said first subhousing, with a semicircular inner sidewall of said first seat arc being flush with said inner face and serving as a first valve seat;

(b) casting a second subhousing having between an inner face and an outer face thereof a second flow portion and a second stem portion, said second stem portion projecting outward from said second flow portion, said second flow portion defining a second cylindrical bore therethrough amid said inner and said outer faces and having a second seat arc that extends radially inward from and approximately 180° along said second cylindrical bore above a horizontal plane that bisects said second subhousing, with a semicircular inner sidewall of said second seat arc being flush with said inner face of said second subhousing and serving as a second valve seat;

(c) fabricating a center subhousing having between a first face and a second face thereof a center flow portion and a center stem portion with said first and said second faces being a predetermined thickness apart, said center stem portion projecting outward from said center flow portion, said center flow portion defining a center cylindrical bore therethrough amid said first and said second faces;

(d) machining smooth said inner faces of each of said first and said second subhousings and said first and said second faces of said center subhousing; and (e) mating said first and said second subhousings by said inner faces thereof to said first and said second faces of said center subhousing so that (I) said first, said center and said second stem portions join to form a single stem housing and (II) said first, said center and said second flow portions join to form a single flow housing with said first, said center and said second cylindrical bores aligned along a flow axis to form a flow passage through said flow housing and with said first and said second valve seats each spaced one half of said predetermined thickness apart from a vertical plane situated equidistantly between said first and said second faces of said center subhousing.

12. The method recited in claim 11 further including the steps of:

(a) boring into said stem housing at least one cylindrical bore along a pivot axis that is transverse to said flow axis, with said pivot axis situated at the intersection of said vertical and said horizontal planes;

(b) sealingly enclosing a shaft within said at least one cylindrical bore with said shaft protruding into said flow passage of said flow housing, said shaft being rotatable about said pivot axis between an opened position and a closed position; and (c) affixing a valve plate to said shaft within said flow passage such that when said shaft is rotated to (I) said closed position, a first arcuate sector of said valve plate seats upon said first valve seat as a second arcuate sector of said valve plate seats upon said second valve seat thereby preventing flow of exhaust gas through said flow passage and (II) said opened position, said valve plate with said arcuate sectors thereon pivots away from said valve seats thereby allowing exhaust gas to flow through said flow passage.

13. The method recited in claim 12 wherein said valve plate has a thickness equal to said predetermined thickness of said center subhousing.

14. The method recited in claim 11 wherein said inner faces of said first and said second subhousings are mated to said first and said second faces of said center subhousing by laser welding.

15. The method recited in claim 11 wherein:

(a) the step of casting said first subhousing involves forming at least one groove within said first stem portion;

(b) the step of casting said second subhousing involves forming at least one groove within said second stem portion; and (c) the step of fabricating said center subhousing involves forming at least one groove within said center stem portion; such that said stem housing formed by the mating of said first, said center and said second subhousings defines at least one cylindrical bore from the mating of said at least one grooves, with said at least one cylindrical bore having a pivot axis transverse to said flow axis and situated at the intersection of said vertical and said horizontal planes.

16. The method recited in claim 15 further including the step of machining smooth an interior surface of said at least one cylindrical bore formed within said stem housing of said valve.

17. A valve comprising:

(a) a first subhousing having between an inner face and an outer face thereof a first flow portion and a first stem portion, said first stem portion projecting outward from said first flow portion, said first flow portion defining a first cylindrical bore therethrough amid said inner and said outer faces and having a first seat arc that extends radially inward from and approximately 180° along said first cylindrical bore below a horizontal plane that bisects said first subhousing, with a semicircular inner sidewall of said first seat arc being flush with said inner face and serving as a first valve seat;

(b) a second subhousing having between an inner face and an outer face thereof a second flow portion and a second stem portion, said second stem portion projecting outward from said second flow portion, said second flow portion defining a second cylindrical bore therethrough amid said inner and said outer faces and having a second seat arc that extends radially inward from and approximately 180° along said second cylindrical bore above a horizontal plane that bisects said second subhousing, with a semicircular inner sidewall of said second seat arc being flush with said inner face of said second subhousing and serving as a second valve seat; and (c) a center subhousing having between a first face and a second face thereof a center flow portion and a center stem portion with said first and said second faces being a predetermined thickness apart, said center stem portion projecting outward from said center flow portion, said center flow portion defining a center cylindrical bore therethrough amid said first and said second faces; said first and said second subhousings being mated by said inner faces thereof to said first and said second faces of said center subhousing so that (I) said first, said center and said second stem portions join to form a single stem housing and (II) said first, said center and said second flow portions join to form a single flow housing with said first, said center and said second cylindrical bores aligned along a flow axis to form a flow passage through said flow housing and with said first and said second valve seats each spaced one half of said predetermined thickness apart from a vertical plane situated equidistantly between said first and said second faces of said center subhousing.

18. The valve recited in claim 17 wherein said stem housing defines at least one cylindrical bore along a pivot axis that is transverse to said flow axis, with said pivot axis situated at the intersection of said vertical and said horizontal planes, said valve further including:

(a) a shaft sealingly enclosed within said at least one cylindrical bore, said shaft protruding into said flow passage of said flow housing and being rotatable about said pivot axis between an opened position and a closed position; and (b) a valve plate affixed to said shaft within said flow passage such that when said shaft is rotated to (I) said closed position, a first arcuate sector of said valve plate seats upon said first valve seat as a second arcuate sector of said valve plate seats upon said second valve seat thereby preventing flow of exhaust gas through said flow passage and (II) said opened position, said valve plate with said arcuate sectors thereon pivots away from said valve seats thereby allowing exhaust gas to flow through said flow passage.

19. The valve recited in claim 18 wherein said valve plate has a thickness equal to said predetermined thickness of said center subhousing.

20. The valve recited in claim 18 wherein said center subhousing is fabricated from sheet metal through a shearing operation, and said valve plate is made from a disk created by punching out said center cylindrical bore in said center flow portion of said center subhousing.

21. The valve recited in claim 17 wherein said inner faces of said first and said second subhousings are mated to said first and said second faces of said center subhousing by laser welding.

* * * * *